United States Patent
Cuenod et al.

(10) Patent No.: US 7,275,264 B2
(45) Date of Patent: Sep. 25, 2007

(54) METHOD OF RESTRICTING ACCESS, FOR THE BENEFIT OF AUTHORIZED USERS, TO RESOURCES BELONGING TO INTERACTIVE SERVICES WITH AT LEAST ONE PACKAGE OF SERVICES

(75) Inventors: Jean-Christophe Cuenod, Degas (FR); Gilles Sgro, Ferry (FR)

(73) Assignee: SAS Validy, Romans sur Isere (FR)

( * ) Notice: Subject to any disclaimer, the term of this patent is extended or adjusted under 35 U.S.C. 154(b) by 620 days.

(21) Appl. No.: 10/451,915

(22) PCT Filed: Dec. 24, 2001

(86) PCT No.: PCT/FR01/04190

§ 371 (c)(1),
(2), (4) Date: Dec. 31, 2003

(87) PCT Pub. No.: WO02/054703

PCT Pub. Date: Jul. 11, 2002

(65) Prior Publication Data

US 2004/0083390 A1 Apr. 29, 2004

(30) Foreign Application Priority Data

Dec. 29, 2000 (FR) .................................. 00 17324

(51) Int. Cl.
*G06F 7/04* (2006.01)
*G06F 11/00* (2006.01)
*G06F 12/14* (2006.01)
*G06F 12/16* (2006.01)
*G06F 11/30* (2006.01)
*G06F 15/16* (2006.01)
*G08B 23/00* (2006.01)
*H04L 9/00* (2006.01)

(52) U.S. Cl. ........................... 726/29; 726/26; 726/27; 726/28; 726/30; 713/165; 713/166; 713/167; 713/189; 709/201; 709/202; 709/220; 709/221

(58) Field of Classification Search ..................... None
See application file for complete search history.

(56) References Cited

FOREIGN PATENT DOCUMENTS

FR 2 779 856 A 12/1999
WO WO99 13438 A 3/1999

*Primary Examiner*—Ayaz Sheikh
*Assistant Examiner*—Longbit Chai
(74) *Attorney, Agent, or Firm*—Sughrue Mion, PLLC (57) ABSTRACT

The subject of the invention concerns a process to restrict, to the benefit of authorized users, access to at least one restricted access resource belonging to at least one interactive service of at least one cluster of services, each user having a processing and memorizing unit linked up to a client machine capable of executing a client program adapted to exchange from a transmission network, data with a server program associated to each interactive service having a service identifier, access to a resource being provided by a request sent by the client program to the server program which processes said request and returns to the client program the response to the request.

14 Claims, 3 Drawing Sheets

METHOD OF RESTRICTING ACCESS, FOR THE BENEFIT OF AUTHORIZED USERS, TO RESOURCES BELONGING TO INTERACTIVE SERVICES WITH AT LEAST ONE PACKAGE OF SERVICES

The subject of the invention concerns the domain of technical means adapted to restrict access to resources belonging to interactive services being part of at least one cluster of services.

The subject of the invention finds a particularly advantageous application in the domain of restricted access to resources belonging to interactive services. As non-limiting example, can be considered interactive services such as the consultation of bank accounts, the consultation of legal and/or commercial information on corporations, the consultation of horoscopes, interactive online games, etc. Said interactive services comprise restricted access resources. For instance, for a service relative to the consultation of bank accounts, a restricted access resource is the display of a bank account which is accessible only to the holder of the account.

Figure 1:
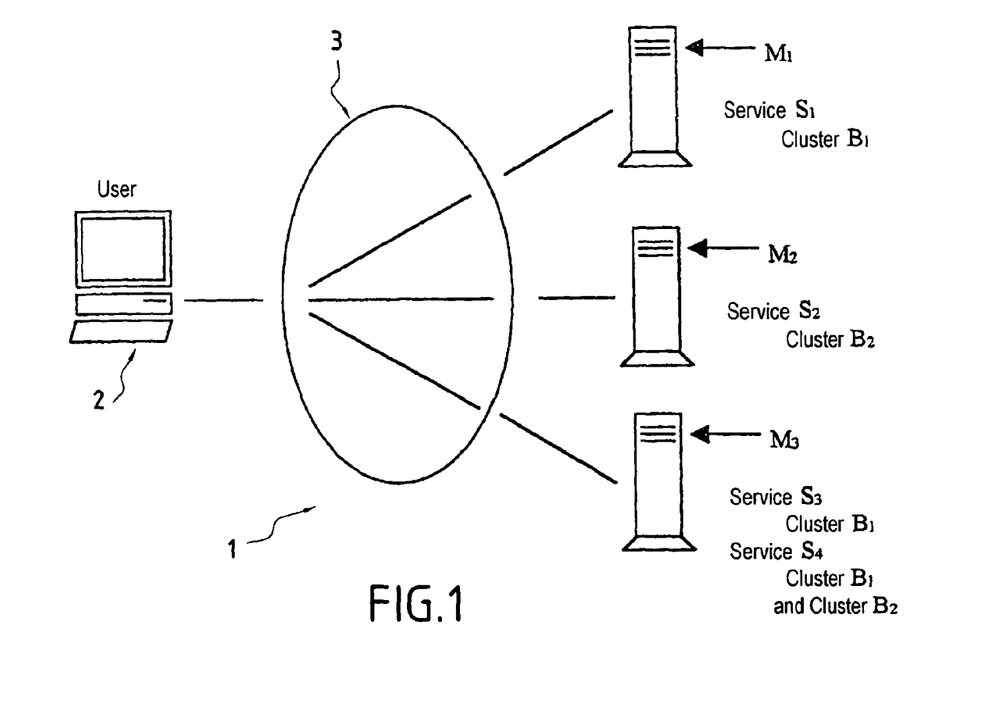
FIG. 1 shows a system enabling implementation of a process according to an exemplary, non-limiting embodiment of the present invention.

To illustrate the subject of the invention, FIG. 1 shows the example of an installation 1 enabling users to access interactive services being part of at least a group or cluster. The installation 1 includes for each user, a client machine 2 enabling to execute a client program adapted to exchange, from a transmission network 3, data with a server program associated to each interactive service. In a simplified manner, each server program of an interactive service is executed by a server machine linked up to the transmission network 3. As non-limiting example, each client machine 2 can be a personal computer, the client program can be a software program of the Internet browser type, the transmission network 3 can be the Internet or an Intranet, the server program can be a web server, and the server machine can be a server of the data processing type.

In the rest of the description, the interactive services shall be referred to as services identifiers $S_i$, (with i varying from 1 to I), the clusters shall be referred to as clusters identifiers $B_j$, (with varying from 1 to J), and the server machines shall be referred to as machines identifiers $M_k$, (with k varying from 1 to K).

In the illustrated example, interactive services having as services identifiers $S_1$, $S_2$, $S_3$ and $S_4$, are accessible respectively from server machines having as machines identifiers $M_1$, $M_2$, $M_3$ and $M_3$. Moreover, the interactive service having as service identifier $S_1$ is part of the cluster having as cluster identifier $B_1$, the interactive service having as service identifier $S_2$ is part of the cluster having as cluster identifier $B_2$, the interactive service having as service identifier $S_3$ is part of the cluster having as cluster identifier $B_1$ and the interactive service having as service identifier $S_4$ is part of the two clusters having as clusters identifiers $B_1$ and $B_2$. In other words, each user wishing to access one of the interactive services having as services identifiers $S_1$, $S_2$, $S_3$ or $S_4$ belonging respectively to the cluster(s) having as clusters identifiers $B_1$, $B_2$, $B_1$, $B_1$ and $B_2$, must submit a request respectively to the server machine having as machine identifier $M_1$, $M_2$, $M_3$ or $M_3$.

For certain applications, the need appears to restrict to the benefit of authorized users, access to interactive services or at least to certain resources of said services. Thus, an interactive service supplier can make at least certain resources of its interactive service accessible to the benefit of users having received an authorization or an access right. Such authorization can be granted to a user in return, for instance, for a subscription to the service, free or in return for payment.

To fulfill the need expressed above, it appears necessary to authenticate in a reliable manner, a user who has sent a request of access to a restricted access resource of a service and to authorize access to said resource only if the user has an authorization.

The subject of the invention aims at fulfilling that authentication need by proposing a process to enable access to restricted access resources of interactive services belonging to at least one cluster, only to the benefit of authorized users.

So as to reach such a goal, the subject of the invention concerns a process to restrict, to the benefit of authorized users, access to at least one resource belonging to at least one interactive service of at least one cluster of services, each user having a client machine capable of executing a client program adapted to exchange from a transmission network, data with a server program associated to each interactive service which has a service identifier, access to a resource being provided by a request sent by the client program to the server program which processes said request and returns to the client program the response to the request.

The process according to the invention includes the following steps:

for each cluster, putting at the disposal of each user, a processing and memorizing unit designed to be linked up to the client machine of the user when he wishes to access at least one restricted access resource, the processing and memorizing unit including:

a cluster identifier enabling to determine the cluster to which the processing and memorizing unit belongs, a processing and memorizing unit identifier enabling to characterize the processing and memorizing unit put at the user's disposal, and a decryption key enabling the decrypting of information coming from a service of the cluster, enabling each client program, to read in the processing and memorizing unit which is linked up to it:

the cluster identifier, and the processing and memorizing unit identifier, sending by each server program for a service, at least once to any client program which has submitted a request to it for said service, a list of clusters identifiers enabling to determine to which cluster(s) belongs the service to which the request was submitted, memorizing by each client program which receives a list of clusters identifiers in response to a request for a service which has a service identifier, a relation between each cluster identifier and the identifier of the concerned service, determining, at the time of the sending of a request to a service which has a service identifier, if the client program has memorized at least one relation between a cluster identifier and the identifier of the concerned service, and in the case where:

a cluster identifier is found, comparing said cluster identifier with the cluster identifier coming from the processing and memorizing unit and if they are equal, adding to the request sent by the client program, the processing and memorizing unit identifier, when a server program receives a request for a service containing a processing and memorizing unit identifier and which requests to access a restricted access resource, determining by using at least the identifier of the concerned service and the processing and memorizing unit identifier, if the user who owns the processing and memorizing unit is entitled to access said resource, and if the user:

is not entitled to access the resource, returning to the client program by the server program, a response corresponding to a refused access, is entitled to access the resource:

determining using at least the processing and memorizing unit identifier, the encryption key corresponding to the decryption key contained in the processing and memorizing unit linked up to the client machine of the user who has sent the request, encrypting by the server program, at least in part, the response to the request of access to the restricted access resource using the encryption key, so as to obtain an encrypted response, and returning to the client program by the server program, said encrypted response, and when a client program receives an encrypted response:

decrypting the encrypted response received by the client program using the decryption key contained in the processing and memorizing unit linked up to it, and presenting the user with the response to his request, as if said request had reached him non encrypted.

Another subject of the invention aims at satisfying that authentication need by proposing a process enabling access to restricted access resources being part of interactive services belonging to at least two clusters.

So as to reach such a goal, the process according to the invention comprises:

determining, at the time of the sending of a request to a service, if the client program has memorized at least one relation between a cluster identifier and the identifier of the concerned service, and in the case where:

several clusters identifiers are found, comparing said clusters identifiers with the cluster identifier coming from the processing and memorizing unit and if an equality is found, adding the cluster identifier to the request sent by the client program and already containing the processing and memorizing unit identifier, when a server program receives a request for a service containing a processing and memorizing unit identifier and a cluster identifier and which requests to access a restricted access resource, determining by using at least the cluster identifier, the identifier of the concerned service and the processing and memorizing unit identifier if the user who owns the processing and memorizing unit is entitled to access said resource, and if the user:

is not entitled to access the resource, returning to the client program by the server program, a response corresponding to a refused access, is entitled to access the resource:

determining using at least the cluster identifier and the processing and memorizing unit identifier, the encryption key corresponding to the decryption key contained in the processing and memorizing unit linked up to the client machine of the user who has sent the request, encrypting by the server program, at least in part, the response to the request of access to the restricted access resource using the encryption key, so as to obtain an encrypted response, and returning to the client program by the server program, said encrypted response.

Another subject of the invention aims at proposing a processing and memorizing unit including at least:

a cluster identifier enabling to determine the cluster to which belongs the processing and memorizing unit, a processing and memorizing unit identifier enabling to characterize the processing and memorizing unit put at the user's disposal, and a decryption key enabling the decrypting of information coming from a service of the cluster.

Another subject of the invention aims at proposing a client machine of the computer type including means to execute a client program implementing the steps of the process in accordance with the invention.

Another subject of the invention aims at proposing a server machine of the data processing type including means to execute a server program implementing the steps of the process in accordance with the invention.

Another subject of the invention aims at proposing a client program to access at least one restricted access resource belonging to at least one interactive service, including means programmed to carry out the steps of the process in accordance with the invention, when said client program is executed on a client machine.

Another subject of the invention aims at proposing a server program for interactive service including means programmed to carry out the steps of the process in accordance with the invention, when said server program is executed on a server machine.

Various other characteristics emerge from the description made below in reference to the appended diagrams which show, as non-limiting examples, embodiments and implementations of the subject of the invention.

Figure 2:
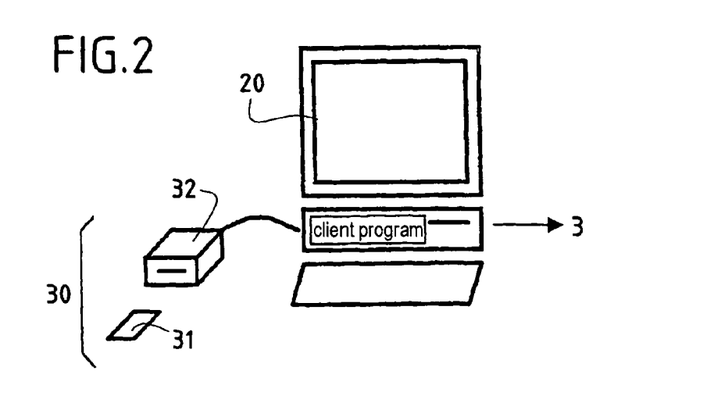
FIG. 2 shows a client machine enabling to implement the process according to the invention.

The subject of the invention concerns a process enabling authorized users, to access at least one restricted access resource belonging to at least one interactive service. For the implementation of the process according to the invention, each user has, as illustrated in FIG. 2, a client machine 20 enabling to execute a client program to access interactive services as explained in FIG. 1.

In accordance with the invention, said client program must include additional functionalities compared to a classical client access program.

As additional functionality, the client program must be able to exchange data with a processing and memorizing unit 30. The processing and memorizing unit 30 includes transfer means and processing and memorizing means. It must be considered that the transfer means are of software and/or hardware nature and are capable of providing and optimizing the data communication between the client machine 20 and the processing and memorizing unit 30.

Said processing and memorizing unit 30 is able to:

using the transfer means:

accept data provided by the client machine 20, and return data to the client machine 20, using the processing and memorizing means:
  to store data possibly in secret and to retain at least a part of said data even when the processing and memorizing unit 30 is switched off,
  and to carry out algorithmic processing on data, part or all of said processing being possibly secret.

As non-limiting example, said processing and memorizing unit 30 can be constituted by a material key on the USB bus of the client machine 20 or, preferably, by a chip card 31 and its interface 32 commonly called card reader linked up to the client machine 20.

In the case where the processing and memorizing unit 30 is constituted by a chip card 31 and its interface 32, the transfer means are split into two parts, one being on the interface 32 and the other one being on the chip card 31. In this embodiment, the absence of the chip card 31 is considered as equivalent to the absence of the processing and memorizing unit 30, inasmuch as the processing and memorizing means contained in the chip card 31 are missing.

The process according to the invention comprises putting at the disposal of each user, for each cluster having as cluster identifier $B_j$, a processing and memorizing unit 30 enabling to access the restricted access resources of the interactive service(s) having as service identifier $S_i$ being part of the cluster. In the case where a user wishes to access two clusters of services, as illustrated in FIG. 1, said user must have a first processing and memorizing unit to access the interactive services of the cluster having as cluster identifier $B_1$ and a second processing and memorizing unit to access the interactive services of the cluster having as cluster identifier $B_2$.

Each processing and memorizing unit 30 includes:
  a cluster identifier BU enabling to determine the cluster to which the processing and memorizing unit 30 belongs,
  a processing and memorizing unit identifier UTM enabling to characterize the processing and memorizing unit 30 put at the user's disposal. Classically, said processing and memorizing unit identifier UTM corresponds, for instance to an identification number of the processing and memorizing unit 30,
  and a decryption key KD enabling the decrypting of information coming from an interactive service of the cluster.

As additional functionality, the client program must be able to exchange additional identification data with server machines.

As additional functionality, the client program which receives a list of cluster identifiers in the response to one of its requests, must be able to memorize relations between the identifier of the service to which the request was submitted and each of the clusters identifiers of the list.

As additional functionality, the client program must be able to decrypt, with the help of the processing and memorizing unit 30, encrypted data coming from the server machines.

For the implementation of the process according to the invention, each server program serving an interactive service executed by a server machine includes additional functionalities compared to a classical server program which does not implement the process according to the invention.

As additional functionality, each server program for a service has a list of clusters identifiers $BS_j$ enabling to determine to which cluster(s) the interactive service belongs. When a request is submitted to the service, the server program for said service sends within the response, said list of clusters identifiers. In the case of FIG. 1, for instance the interactive service having as identifier $S_1$ returns the list $\{B_1\}$ and the interactive service having as identifier $S_4$ returns the list $\{B_1, B_2\}$.

As additional functionality, each server program of an interactive service executed on a server machine determines if a user who has a processing and memorizing unit having as processing and memorizing unit identifier UTM, is entitled to access a restricted access resource. Thus, the server program authorizes or refuses access to said restricted access resource and if access is authorized, encrypts at least in part the response to the request.

Figure 3:
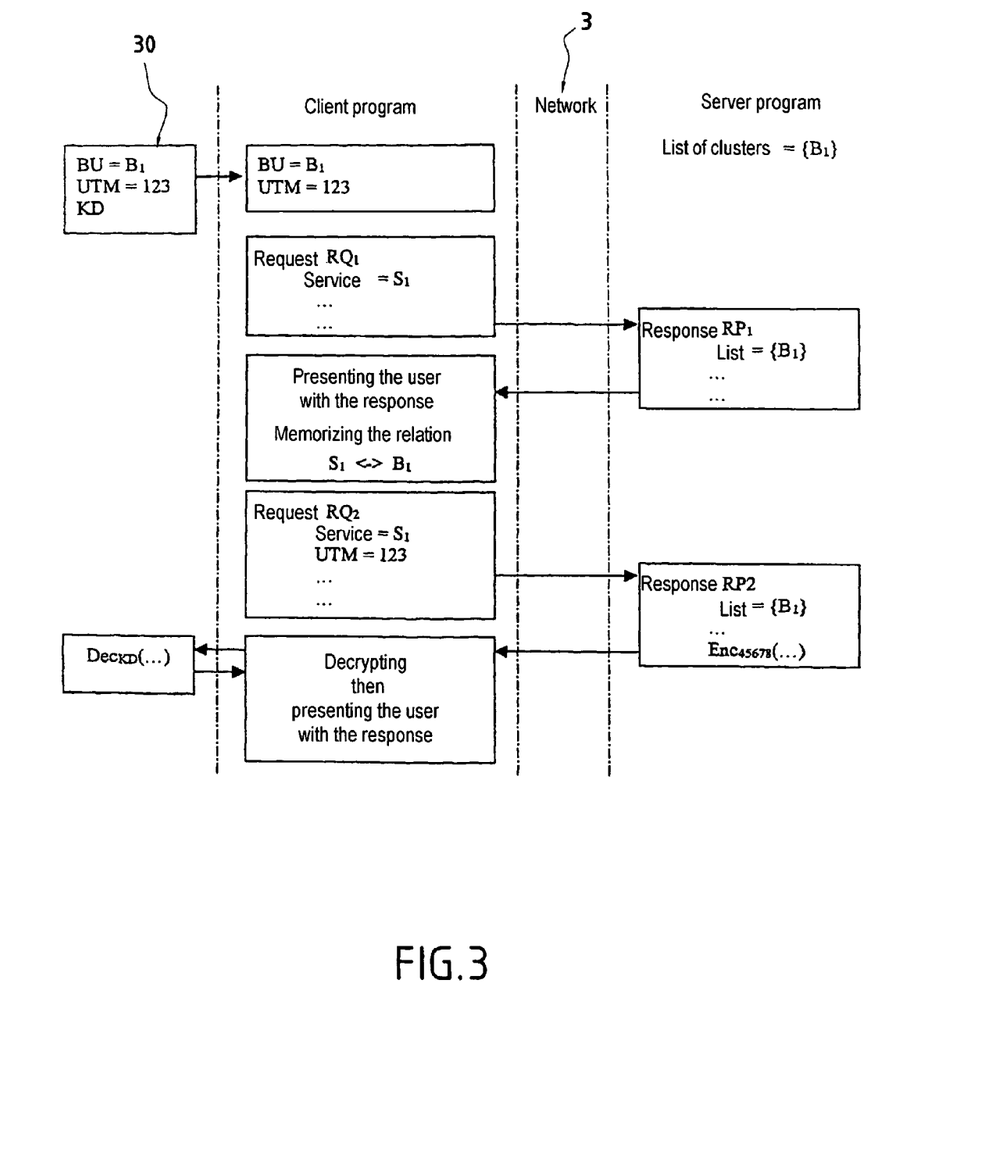
FIG. 3 shows the sequence of data exchange between the client program of the user and the server program of the service in the case where the process according to the invention enables access to a service belonging to a cluster.

The following description in relation to FIG. 3 makes explicit the process according to the invention enabling a user to access an interactive service belonging to only one cluster at a time. In the illustrated example, it is considered that the user wishes to access the interactive service having as service identifier $S_1$ belonging to the cluster having as cluster identifier $B_1$.

A user wishing to access a resource belonging to an interactive service having as service identifier $S_1$, must have a processing and memorizing unit 30 corresponding to the access to said service, i.e. a processing and memorizing unit associated to the cluster having as cluster identifier $B_1$.

When the processing and memorizing unit 30 is linked up to the client machine 20, the corresponding client program reads in the processing and memorizing unit which is linked up to it:
  the cluster identifier BU. In the considered example, BU is equal to $B_1$,
  and the processing and memorizing identifier UTM. In the considered example, UTM is equal to 123.

The client program submits to the server program for the service having as service identifier $S_1$, a first request $RQ_1$. Inasmuch as the client program does not know yet whether the server program belongs to a cluster or not, the request sent is a standard request identical to the one sent by a standard client program.

The server program for the service, having received the access request $RQ_1$, sends at least once within the response $RP_1$ to the client program which has submitted the request $RQ_1$ to it, the list of clusters identifiers $BS_j$. In the considered example, the list is constituted by only one element and is therefore represented by $\{B_1\}$.

The client program which receives the response $RP_1$ containing at least one list of clusters identifiers $BS_j$, memorizes a relation between the service identifier $S_1$ corresponding to the service to which the request $RQ_1$ has been submitted and each cluster identifier $BS_j$. In the illustrated example, the list has only one element and the client program memorizes one relation between the service identifier $S_1$ and the cluster identifier $B_1$.

When the user wishes to access again the interactive service having as service identifier $S_i$, the client program prepares a second access request $RQ_2$. At the time of the establishing of said second access request $RQ_2$, the client program determines if it has memorized at least one relation between the concerned service identifier $S_i$ and a cluster identifier $BS_j$.

In the case where no relation is found, the client program sends a request similar to the request $RQ_1$. In the case where a cluster identifier $BS_j$ is found, the client program compares said cluster identifier $BS_j$ with the cluster identifier BU coming from the processing and memorizing unit. If there is no equality between the cluster identifier $BS_j$ and the cluster identifier BU, the client program sends a request similar to the request $RQ_1$. If the cluster identifier $BS_j$ and the cluster identifier BU are equal, the client program adds to its request $RQ_2$, the processing and memorizing unit identifier UTM.

In the illustrated example, at the time of the sending of the request $RQ_2$ to the interactive service having as service identifier $S_1$, the client program detects that it has memorized a relation between $S_1$ and $B_1$, so much so that it compares $B_1$ with the cluster identifier BU coming from its processing and memorizing unit. Since the processing and memorizing unit also contains the cluster identifier $B_1$, the client program adds to its request $RQ_2$, the processing and memorizing unit identifier UTM which, in the example, is equal to 123.

When the server program receives a request $RQ_2$ containing a processing and memorizing unit identifier UTM and corresponding to a request of access to a restricted access resource, the server program determines whether or not the user owning the processing and memorizing unit is entitled to access the restricted access resource. The server program determines that authorization by using at least the service identifier $S_i$ corresponding to the requested service and the processing and memorizing unit identifier UTM. So as to do so, the server program consults, for instance, a database including for the considered service the list of the processing and memorizing unit identifiers UTM authorized to access the requested restricted access resource.

In the case where the server program concludes that the user is not entitled to access the restricted access resource, the server program sends to the client program a response $RP_2$ corresponding to a refused access.

In the case where the server program concludes that the user is entitled to access the restricted access resource, is carried out the determination of an encryption key KE corresponding to the decryption key KD contained in the processing and memorizing unit having as processing and memorizing unit identifier UTM. Said encryption key KE is determined using at least the processing and memorizing unit identifier UTM.

The server program then encrypts at least in part, the response to the request of access to the restricted access resource by using the encryption key KE, so as to obtain an encrypted response $RP_2$. The server program then returns to the client program, said encrypted response $RP_2$. It must be understood that when the server program encrypts, at least in part, a response, said server program generally encrypts preferentially, at least in part, the content of said response.

In the illustrated example, the server program detects in the request $RQ_2$, the presence of a processing and memorizing unit identifier namely UTM=123. As it happens that the request $RQ_2$ corresponds to a request of access to a restricted access resource, the server program determines using at least the service identifier $S_1$ and the processing and memorizing unit identifier 123, that access is authorized. The server program then determines the encryption key KE using at least the processing and memorizing unit identifier 123. For instance, the encryption key KE is equal to 45678. The server program encrypts using said key KE, at least in part the response to the request of access $RQ_2$.

When the client program receives the encrypted response $RP_2$, the client program decrypts said encrypted response with the help of the decryption key KD contained in the processing and memorizing unit which is linked up to it. The client program then presents the user with the response to his request as if it had reached him non encrypted.

Figure 4:
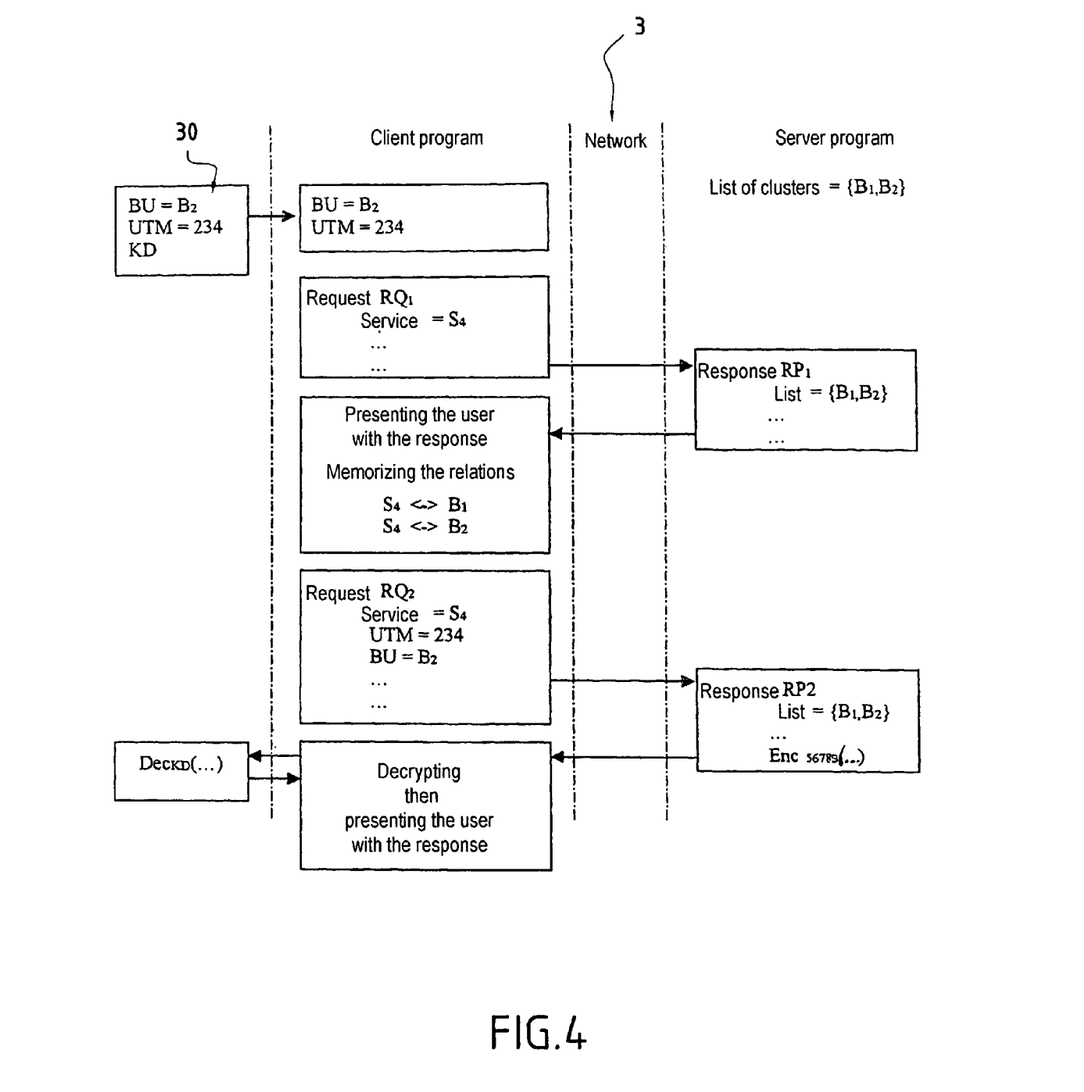
FIG. 4 shows the sequence of data exchange between the client program of the user and the server program of the service in the case where the process according to the invention enables access to a service belonging simultaneously to several clusters of services.

In the example described in FIG. 3, the process according to the invention enables a user to access an interactive service belonging to only one cluster at a time. FIG. 4 makes explicit the process according to the invention enabling a user to access an interactive service belonging simultaneously to several clusters of services. In the illustrated example, it is considered that the user wishes to access the interactive service having as service identifier $S_4$, being part of two clusters having as clusters identifiers $B_1$ and $B_2$.

A user wishing to access a resource belonging to the interactive service having as service identifier $S_4$, must have for at least one of the clusters $B_1$ or $B_2$, a processing and memorizing unit 30 enabling to access that cluster. In the example of FIG. 4, it is supposed that the user has at least one processing and memorizing unit associated to the cluster having as cluster identifier $B_2$. (The description would be similar if the user had a processing and memorizing unit associated to the cluster having as cluster identifier $B_1$.)

When the processing and memorizing unit 30 is linked up to the client machine 20, the corresponding client program reads in the processing and memorizing unit which is linked up to it:

the cluster identifier BU. In the considered example, BU is equal to $B_2$, and the processing and memorizing unit identifier UTM. In the considered example, UTM is equal to 234.

After the sending by the client program of a first request $RQ_1$ for the interactive service having as service identifier $S_4$ to the server program for said service, said server program for the service having received the request of access $RQ_1$, sends at least once within the response $RP_1$, to the client program which has submitted the request $RQ_1$ to it, the list of clusters identifiers $BS_j$. In the considered example, the list is constituted by two elements and is therefore represented by $\{B_1, B_2\}$.

The client program which receives the response $RP_1$ containing at least one list of clusters identifiers $BS_j$, memorizes a relation between the service identifier $S_i$ corresponding to the service to which the request $RQ_1$ has been submitted and each cluster identifier $BS_j$. In the considered example, the list has two elements and the client program memorizes, on the one hand, a relation between the service identifier $S_4$ and the cluster identifier $B_1$ and, on the other hand, a relation between the service identifier $S_4$ and the cluster identifier $B_2$.

When the user wishes to access again the interactive service having as service identifier $S_i$, the client program prepares a second access request $RQ_2$. At the time of the establishing of said second access request $RQ_2$, the client program determines if it has memorized at least one relation between the concerned service identifier $S_i$ and a cluster identifier $BS_j$.

In the case where no relation is found, the client program sends a request similar to the request $RQ_1$. In the case where one or several clusters identifiers $BS_j$ are found, the client program compares said cluster(s) identifier(s) $BS_j$ with the cluster identifier BU coming from the processing and memorizing unit. If there is no equality between the cluster(s) identifier(s) $BS_j$ and the cluster identifier BU, the client program sends a request similar to the request $RQ_1$. If equality is found between a cluster identifier $BS_j$ and the cluster identifier BU, the client program adds to its request $RQ_2$, the processing and memorizing unit identifier UTM and the cluster identifier BU.

In the illustrated example, at the time of the sending of the request $RQ_2$ to the interactive service having as service identifier $S_4$, the client program detects that it has memorized a relation between $S_4$ and $B_1$ and a relation between $S_4$ and $B_2$. The client program then compares the cluster identifier BU coming from its processing and memorizing unit, respectively with the clusters identifiers $B_1$ and $B_2$.

Since the processing and memorizing unit linked up to the client machine contains the cluster identifier $B_2$, the client program adds to its request $RQ_2$, the processing and memorizing unit identifier UTM and the cluster identifier BU, which, in the example, are respectively equal to 234 and $B_2$.

When the server program receives a request $RQ_2$ containing a processing and memorizing unit identifier UTM and a cluster identifier BU, and corresponding to a request of access to a restricted access resource, the server program determines whether or not the user owning the processing and memorizing unit is entitled to access the restricted access resource. The server program determines that authorization by using at least the cluster identifier BU, the service identifier $S_i$ corresponding to the requested service and the processing and memorizing unit identifier UTM.

In the case where the server program concludes that the user is not entitled to access the restricted access resource, the server program sends to the client program a response $RP_2$ corresponding to the refused access.

In the case where the server program concludes that the user is entitled to access the restricted access resource, is carried out the determination of an encryption key KE corresponding to the decryption key KD contained in the processing and memorizing unit having as processing and memorizing unit identifier UTM and as cluster identifier BU. Said encryption key KE is determined using at least the cluster identifier BU and the processing and memorizing unit identifier UTM.

The server program then encrypts, at least in part, the response to the request of access to the restricted access resource by using the encryption key KE, so as to obtain an encrypted response $RP_2$. The server program then returns to the client program said encrypted response $RP_2$.

In the illustrated example, the server program detects in the request $RQ_2$, on the one hand, the presence of a processing and memorizing unit identifier UTM, namely UTM=234 and, on the other hand, a cluster identifier BU, namely $B_2$. As it happens that the request $RQ_2$ corresponds to a request of access to a restricted access resource, the server program determines that access is authorized using at least the service identifier $S_4$, the cluster identifier $B_2$ and the processing and memorizing unit identifier 234. The server program then determines the encryption key KE using at least the cluster identifier $B_2$ and the processing and memorizing unit identifier 234. For instance, the encryption key KE is equal to 56789. The server program encrypts using said key KE, at least in part the response to the request of access $RQ_2$.

As explained in relation to FIG. 3, when the client program receives the encrypted response $RP_2$, the client program decrypts said encrypted response with the help of the decryption key KD contained in the processing and memorizing unit which is linked up to it. The client program then presents the user with the response to his request as if it had reached him non encrypted.

As it emerges from the previous description, the process according to the invention enables to authenticate in a simple and reliable manner, thanks to the implementation of processing and memorizing units, a user wishing to access restricted access resources of interactive services belonging to one or several clusters of services.

According to a characteristic of implementation of the invention, the process can enable to link up simultaneously several processing and memorizing units $30_l$, with 1 varying from 1 to L, to the client machine 20 of a user. According to that variant embodiment, the process according to the invention is modified in the following manner.

The client program is adapted to read, in each of the processing and memorizing units which are linked up to it:
the cluster identifier $BU_1$,
and the processing and memorizing unit identifier $UTM_1$.

When the client program sends a request to a service having as service identifier $S_i$, the client program determines if it has memorized at least one relation between the concerned service identifier $S_i$ and a cluster identifier $BS_j$. In the case where a cluster identifier $BS_j$ is found, the client program compares said cluster identifier $BS_j$ with the clusters identifiers $BU_1$ coming from the processing and memorizing units.

If equality is found, the client program adds to the sent request, the processing and memorizing unit identifier $UTM_1$ having checked the equality.

When the client program sends a request to a service having as service identifier $S_i$ and for which it has memorized at least two clusters identifiers $BS_j$, the client program compares the clusters identifiers $BS_j$ with the clusters identifiers $BU_1$ coming from the processing and memorizing units.

If a least one equality is found, the client program:
chooses one of the processing and memorizing units having checked an equality,
and adds to the request sent by the client program, the chosen processing and memorizing unit identifier $UTM_1$ and the corresponding cluster identifier $BU_1$.

When the client program receives an encrypted response, the client program must find the processing and memorizing unit whose identifier $UTM_1$ has been transmitted during the request corresponding to said response. The three following preferred implementations are possible:
the client program memorizes the processing and memorizing unit identifier which is transmitted during a request and is able to find said identifier during the response,
the server program returns to the client program within the response, the processing and memorizing unit identifier $UTM_1$ received in the request, thus enabling the client program to find said identifier,
the client program questions each of the processing and memorizing units, so as to find the processing and memorizing unit to use.

When the processing and memorizing unit is found, the client program decrypts the encrypted response using the decryption key $KD_1$ contained in the processing and memorizing unit thus found.

In the previous description, the process aims at determining whether or not the user is entitled to access a restricted access resource. It must be considered that said determination can be carried out:
either only through the server program,
or through the server program helped by a remote auxiliary program.

Said remote auxiliary program can run on a machine distinct from the server machine for a service. According to a preferred embodiment, it can be planned to gather together on a same machine the remote auxiliary programs of all the services of a cluster, so as to centralize the access rights management.

In the previous description, the process consists in determining the encryption key KE. Note that the determination of said encryption key KE can be carried out:
either only through the server program,
or through a server program helped by a remote auxiliary program.

According to a variant embodiment of the invention, the encryption key KE can be determined:
   either through the server program associated to a processing and memorizing unit,
   or through the server program using a remote auxiliary program and a processing and memorizing unit.

According to another variant embodiment of the invention, it can be planned to associate to each processing and memorizing unit:
   at least one meter enabling to count accesses to restricted access resources, made by the user owning a processing and memorizing unit,
   and a threshold for said meter.

Each server program for a service which receives a request of access to a restricted access resource, consults the values of the meter and threshold associated to the processing and memorizing unit used to send the request, so as to determine whether said request should be served or not. If the request is served, the server program possibly updates the meter's value.

According to a preferred variant embodiment of the invention, the meter is situated in a machine which centralizes the management of the metering of accesses to restricted access resources.

According to another variant embodiment of the invention, each process and memorizing unit comprises or includes:
   a meter enabling to count the use of the decryption key KD,
   and a threshold for said meter.

Such a meter is updated every time the decryption key KD is used and the decrypting of the encrypted responses received by the client program is forbidden when the meter reaches or exceeds the threshold.

The invention claimed is:

1. A process to restrict, to a benefit of authorized users, access to at least one resource belonging to at least one interactive service of at least one cluster of services, each said authorized user having a client machine capable of executing a client program adapted to exchange, using a transmission network, data with a server program associated to each said interactive service, each said interactive service being identified by a service identifier and said interactive service being provided by requests sent by said client program to said server program which processes each of said reguests and returns to said client program a response for each said requests, characterized in that the process includes the following steps:
   (a) for each said cluster, putting at a disposal of each of said authorized users, a processing and memorizing unit designed to be linked up to said client machine of said authorized user when requesting to access at least one said restricted access resource, said processing and memorizing unit including:
      (1) a cluster identifier determining the cluster to which said processing and memorizing unit belongs,
      (2) a processing and memorizing unit identifier characterizing said processing and memorizing unit put at a disposal of said authorized user, and
      (3) a decryption key allowing to decrypt the information coming from any of said services of said determined cluster,
   (b) enabling each said client program, to read inside said processing and memorizing unit which is linked up to it:
      (1) said cluster identifier,
      (2) and said processing and memorizing unit identifier,
   (c) sending inside a first response, by said server program for said service, at least once to any said client program which has submitted a first request for said service, a list of clusters identifiers determining to which cluster(s) the service to which said first request was submitted belongs,
   (d) memorizing by each said client program which receives said list of clusters identifiers in response to said first request for said service having a service identifier, a relation between each said cluster identifier and said service identifier,
   (e) determining, prior to the sending of a second request to said service having said service identifier, if said client program has memorized at least one relation between any cluster identifier and said service identifier and in the case where:
      (1) any cluster identifier is found, comparing it with said cluster identifier coming from said processing and memorizing unit and if they are equal, adding to said second request to be sent by said client program, said processing and memorizing unit identifier,
   (f) when said server program receives said second request for said service, containing said processing and memorizing unit identifier and which requests to access said restricted access resource, determining by using at least said service identifier and said processing and memorizing unit identifier, if said user who owns said processing and memorizing unit is entitled to access said resource, and if said user:
      (1) is not entitled to access said resource, returning to said client program by said server program, a second response corresponding to a refused access,
      (2) is entitled to access said resource:
         (i) determining using at least said processing and memorizing unit identifier, an encryption key corresponding to said decryption key contained in said processing and memorizing unit linked up to said client machine of said user who has sent said second request,
         (ii) encrypting by said server program, at least in part, a second response to said second request of access to said restricted access resource using said encryption key, so as to obtain an encrypted second response,
         (iii) and returning to said client program by said server program, said encrypted second response,
   (g) and when said client program receives said encrypted second response:
      (1) decrypting said encrypted second response received by said client program using said decryption key contained in said processing and memorizing unit linked up to it,
      (2) and presenting said user with the response to his request, as if said second response had reached him non encrypted.

2. Process according to claim 1, characterized in that it comprises:
   (a) determining, prior to sending any request to said service, if said client program has memorized at least one said relation between said cluster identifier and said service identifier, and in the case where:
      (1) several said clusters identifiers are found, comparing said clusters identifiers with said cluster identifier coming from said processing and memorizing unit and if an equality is found, adding said cluster identifier to said any request to be sent by said client program and already containing said processing and memorizing unit identifier, (b) when said server program receives said any request for said service containing said processing and memorizing unit identifier and said cluster identifier and which requests to access said restricted access resource, determining by using at least said cluster identifier, said service identifier and said processing and memorizing unit identifier if said user who owns said processing and memorizing unit is entitled to access said resource, and if said user:
  (1) is not entitled to access said resource, returning to said client program by said server program, a response corresponding to a refused access,
  (2) is entitled to access said resource:
    (i) determining using at least said cluster identifier and said processing and memorizing unit identifier an encryption key corresponding to said decryption key contained in said processing and memorizing unit linked up to said client machine of said user who has sent said any request,
    (ii) encrypting by said server program, at least in part, a response to said any request of access to said restricted access resource using said encryption key, so as to obtain an encrypted response,
    (iii) and returning to said client program by said server program, said encrypted response.

3. Process according to claims 1 or 2, characterized in that it comprises:
  (a) enabling to link up simultaneously several said processing and memorizing units, to said client machine of at least one said user,
  (b) enabling each said client program of said client machine to read inside each said processing and memorizing units which are linked up to it:
    (1) said cluster identifier,
    (2) said processing and memorizing unit identifier,
  (c) determining prior to the sending of any request to said service having said service identifier, if said client program has memorized at least one said relation between said cluster identifier and said service identifier and in the case where:
    (1) one said cluster identifier is found, comparing said cluster identifier with the clusters identifiers coming from said processing and memorizing units and if an equality is found, adding to said any request sent by said client program, the processing and memorizing unit identifier having realized said equality,
    (2) several said clusters identifiers are found, comparing said clusters identifiers with the clusters identifiers coming from said processing and memorizing units and if at least one equality is found:
      (i) choosing one of said processing and memorizing units having realized an equality,
      (ii) and adding to said any request sent by said client program, the chosen processing and memorizing unit identifier and the corresponding cluster identifier,
  (d) when said client program receives an encrypted response:
    (1) finding the processing and memorizing unit whose identifier has been transmitted during the request corresponding to said response,
    (2) decrypting said encrypted response received by said client program using the decryption key contained in the processing and memorizing unit thus found.

4. Process according to claim 1 or 2, characterized in that it comprises determining whether or not said user is entitled to access said restricted access resource:
  (a) either only through said server program,
  (b) or through said server program using a remote auxiliary program.

5. Process according to claim 1 or 2, characterized in that it comprises determining said encryption key:
  (a) either only through said server program,
  (b) or through said server program using a remote auxiliary program.

6. Process according to claim 5, characterized in that it comprises determining said encryption key:
  (a) either through said server program and a server processing and memorizing unit,
  (b) or through said server program using said remote auxiliary program and a server processing and memorizing unit.

7. Process according to claims 1 or 2, characterized in that it comprises:
  (a) associating to each said processing and memorizing unit:
    (1) at least one meter enabling to count accesses to said restricted access resources made by said user owning said processing and memorizing unit,
    (2) a threshold for said meter,
  (b) enabling each said server program for said service, which receives a request of access to said restricted access resource:
    (1) to consult the values of said meter and said threshold associated to the processing and memorizing unit used to send said request, so as to determine whether said request should be served or not,
    (2) and if said request is served, to possibly update the meter's value.

8. Process according to claims 1 or 2, characterized in that it comprises:
  (a) integrating to each said processing and memorizing unit:
    (1) a meter enabling to count the use of the decryption key,
    (2) a threshold for said meter,
  (b) updating said meter every time said decryption key is used,
  (c) and preventing decryption of an encrypted responses received by said client program when said meter reaches or exceeds said threshold.

9. Processing and memorizing unit for the implementation of the process according to claims 1 or 2, characterized in that it includes at least:
  (a) a cluster identifier enabling to determine the cluster to which said processing and memorizing unit belongs,
  (b) a processing and memorizing unit identifier enabling to characterize said processing and memorizing unit put at the user's disposal,
  (c) and a decryption key enabling the decrypting of information coming from a service of the cluster.

10. Processing and memorizing unit according to claim 9, characterized in that it includes:
  (a) a meter enabling to count the use of said decryption key,
  (b) a threshold for said meter.

11. Client machine of the computer type, characterized in that it includes means to execute a client program imple menting the steps of the process in accordance with claim 1 or 2.

12. Server machine of the data processing type, characterized in that it includes means to execute a server program implementing the steps of the process in accordance with claim 1 or 2.

13. Client program to access at least one restricted access resource belonging to at least one interactive service, comprising means programmed to carry out the steps of the process in accordance with claim 1 or 2, when said client program is executed on a client machine.

14. Server program for interactive service comprising means programmed to carry out the steps of the process in accordance with claim 1 or 2, when said server program is executed on a server machine.

\* \* \* \* \*